US008838588B2

(12) United States Patent
Ruvolo et al.

(10) Patent No.: US 8,838,588 B2
(45) Date of Patent: Sep. 16, 2014

(54) SYSTEM AND METHOD FOR DYNAMICALLY TRACKING USER INTERESTS BASED ON PERSONAL INFORMATION

(75) Inventors: Joann Ruvolo, San Jose, CA (US); Stefan Bengt Edlund, San Jose, CA (US); Vikas Krishna, San Jose, CA (US); Justin Thomas Lessler, Baltimore, MD (US); Carl J. Kraenzel, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 1241 days.

(21) Appl. No.: 11/094,031

(22) Filed: Mar. 30, 2005

(65) Prior Publication Data

US 2006/0230012 A1    Oct. 12, 2006

(51) Int. Cl.
*G06F 17/30* (2006.01)

(52) U.S. Cl.
CPC ............................... *G06F 17/30702* (2013.01)
USPC .......................................................... 707/732

(58) Field of Classification Search
USPC ..................................................... 707/1, 732
See application file for complete search history.

(56) References Cited

U.S. PATENT DOCUMENTS

| | | | | |
|---|---|---|---|---|
| 5,642,502 | A * | 6/1997 | Driscoll | 707/5 |
| 6,012,053 | A * | 1/2000 | Pant et al. | 707/3 |
| 6,115,709 | A | 9/2000 | Gilmour et al. | |
| 6,154,783 | A | 11/2000 | Gilmour et al. | |
| 6,205,472 | B1 | 3/2001 | Gilmour | |
| 6,253,202 | B1 | 6/2001 | Gilmour | |
| 6,377,949 | B1 | 4/2002 | Gilmour | |
| 6,385,619 | B1 * | 5/2002 | Eichstaedt et al. | 707/104.1 |
| 6,405,197 | B2 | 6/2002 | Gilmour | |
| 6,421,669 | B1 | 7/2002 | Gilmour et al. | |
| 6,640,229 | B1 | 10/2003 | Gilmour et al. | |
| 6,647,384 | B2 | 11/2003 | Gilmour | |
| 6,654,735 | B1 * | 11/2003 | Eichstaedt et al. | 707/3 |
| 2003/0074409 | A1 * | 4/2003 | Bentley | 709/206 |
| 2004/0122681 | A1 | 6/2004 | Ruvolo et al. | |
| 2004/0122803 | A1 | 6/2004 | Dom et al. | |
| 2005/0071328 | A1 * | 3/2005 | Lawrence | 707/3 |
| 2005/0198559 | A1 * | 9/2005 | Fujiwara | 715/500 |
| 2006/0206480 | A1 * | 9/2006 | Heidloff et al. | 707/6 |
| 2006/0224552 | A1 * | 10/2006 | Riezler et al. | 707/1 |

OTHER PUBLICATIONS

Justin Lessler, Stefan Edlund, Joann Ruvolo, Vikas Krishna, "Dynamic Interest Profiles Tracking User Interests Using Personal Information", ICEIS Apr. 17, 2004.*

(Continued)

*Primary Examiner* — Joshua Bullock
(74) *Attorney, Agent, or Firm* — Schmeiser, Olsen & Watts LLP

(57) ABSTRACT

Described are a dynamic interest profile (DIP) system and method for dynamically tracking interests of a user based on personal information. The DIP system obtains electronic documents of the user from a document stream and processes the documents to obtain certain information therefrom. Based on the information obtained from the documents, the DIP system identifies terms, people, documents, and collections that are of importance to the user. These items of importance become part of a dynamic interest profile of the user. The dynamic interest profiles persist in a database. The DIP system also provides an application program interface (API) for accessing DIPs in the database. Application programs can employ this API to customize program behavior to the particular interests of the user executing those programs.

20 Claims, 7 Drawing Sheets

(56) References Cited

OTHER PUBLICATIONS

Reyle, U. et al.; "Ontology Driven Information Extraction"; Proceedings of the 19th Twente Workshop on Language Technology; University of Twente; 2001.

Thanopoulos, A. et al.; Text Tokenization for Knowledge-free Automatic Extraction of Lexical Similarities; TALN 2003.

Whittaker, S. et al.; "Contact Management: Identifying Contacts to Support Long-Term Communication"; CSCW 2002.

Yang, Y. et al.; "A Comparative Study on Feature Selection in Text Categorization"; Proceedings of ICML-97; 14th International Conference on Machine Learning.

\* cited by examiner

SYSTEM AND METHOD FOR DYNAMICALLY TRACKING USER INTERESTS BASED ON PERSONAL INFORMATION

FIELD OF THE INVENTION

The invention relates generally to personal information management systems. More specifically, the invention relates to a system and method for dynamically tracking user interests based on personal electronic documents and on the actions of users.

BACKGROUND

Differences in user interests and preferences offer a challenge to developers of software applications. For example, when retrieving email messages some users make meticulous use of folder structures to file and find email, whereas others keep most, if not all, email messages in one folder, typically the inbox, and use search or sorting to find needed documents. Because of these differences, attempts to add intelligence to software applications can often fail. What may seem like a helpful program feature to some users may be bothersome to others, what is important to one person may not be important to another, and what is currently important to that person may change over time. Without personalized information, application programs typically cater to the lowest common denominator (e.g., alphabetical listing of names for an auto-completion program, a presentation of search results based on lexical similarity).

Accordingly, software developers have begun constructing profiles of user interests and providing application program interfaces to access these profiles so that the application can have tailored behavior. Such personal information management (PIM) applications, however, are not free from the problem posed by user differences. Previous approaches to solving this problem include prompting the user for a series of terms and categories of interest, tracking user web searches, and various machine-learning techniques. User entry of important topics, however, can be time-consuming and often inaccurate: users may not remember or may remember inaccurately those topics that are actually of importance. Other users do not want to bother with the machine-learning process, choosing to forego personalized application behavior rather than to sacrifice valuable time supplying data to their computer system. There remains a need, therefore, for an automated system and method for identifying and tracking the personal interests of a user and for enabling application programs to make use of these personal interests in order to provide program behavior tailored to the user.

SUMMARY

In one aspect, the invention features a method for tracking interests of a user based on personal information. The method comprises monitoring a stream of documents to obtain a plurality of electronic documents of the user. The plurality of electronic documents is processed to obtain information therefrom. Based on the information obtained from the plurality of electronic documents, at least one person of importance to the user and one term of importance to the user are determined. An interest profile of the user that includes each person and each term of importance is generated.

In another aspect, the invention features a system for tracking interests of a user based on personal information. The system comprises a text processor parsing through text in a plurality of electronic documents to produce tokens. A document processor determines at least one person of importance to a given user and one term of importance to that user based on tokens produced by text processor and generates a dynamic interest profile of that user that includes each determined person and term of importance.

In still another aspect, the invention features a computer program product for use with a computer system. The computer program product comprises a computer useable medium having embodied therein program code comprising program code for monitoring a stream of documents to obtain a plurality of electronic documents of a user, program code for processing the plurality of electronic documents to obtain information therefrom, program code for determining at least one person of importance to the user and one term of importance to the user based on the information obtained from the plurality of electronic documents, and program code for generating an interest profile of the user that includes each person and each term of importance.

In yet another aspect, the invention features a computer data signal embodied in a carrier wave for use with a computer system having a display and capable of generating a user interface through which a user may interact with the computer system. The computer data signal comprising program code for monitoring a stream of documents to obtain a plurality of electronic documents of a user, program code for processing the plurality of electronic documents to obtain information therefrom, program code for determining at least one person of importance to the user and one term of importance to the user based on the information obtained from the plurality of electronic documents, and program code for generating an interest profile of the user that includes each person and each term of importance.

BRIEF DESCRIPTION OF THE DRAWINGS

The above and further advantages of this invention may be better understood by referring to the following description in conjunction with the accompanying drawings, in which like numerals indicate like structural elements and features in various figures. The drawings are not necessarily to scale, emphasis instead being placed upon illustrating the principles of the invention.

DETAILED DESCRIPTION

The present invention features a personal information management system and method for inferring and tracking a user's interests based on the personal documents and actions of the user. Such personal documents include, but are not limited to, email messages, online calendar and scheduling entries, word processing documents, instant messaging, presentations, and scanned documents. From examination of a user's various personal documents, the system identifies terms, people, documents, and collections deemed important to that user. Determinations of importance arise from, for example, metadata and subject fields associated with a document and user storage structure (i.e., collections, folders). A variety of statistical techniques, specific to the type of entity, can serve to determine the importance of a given term, person, document, or collection.

A database maintains an interest profile for the user containing the identified important items. This interest profile changes dynamically—hence, called a dynamic interest profile or DIP—when the set of the documents of the user changes because of deleted, added, or modified documents. Because compilation of a user's DIP can occur over a potentially long period and be based on a large corpus of documents, the DIP system performs incremental updates to refine importance scores gradually. Further, the use of incremental updates enables the loading of smaller "active" working sets of interest profiles into computer (e.g., server) memory on demand.

In addition to tracking items of overall importance, the system may also identify terms, people, documents, and collections of emerging importance to the user. The system can also provide an application program interface (API) for communicating with the database storing the DIPs. Application programs can use this API to obtain terms, people, documents, or collections of overall or emerging importance to the user. In addition, because documents can contain sensitive information that a user may be unwilling to disclose, the system can employ various security and privacy mechanisms for preventing access to the sensitive personal information.

Figure 1:
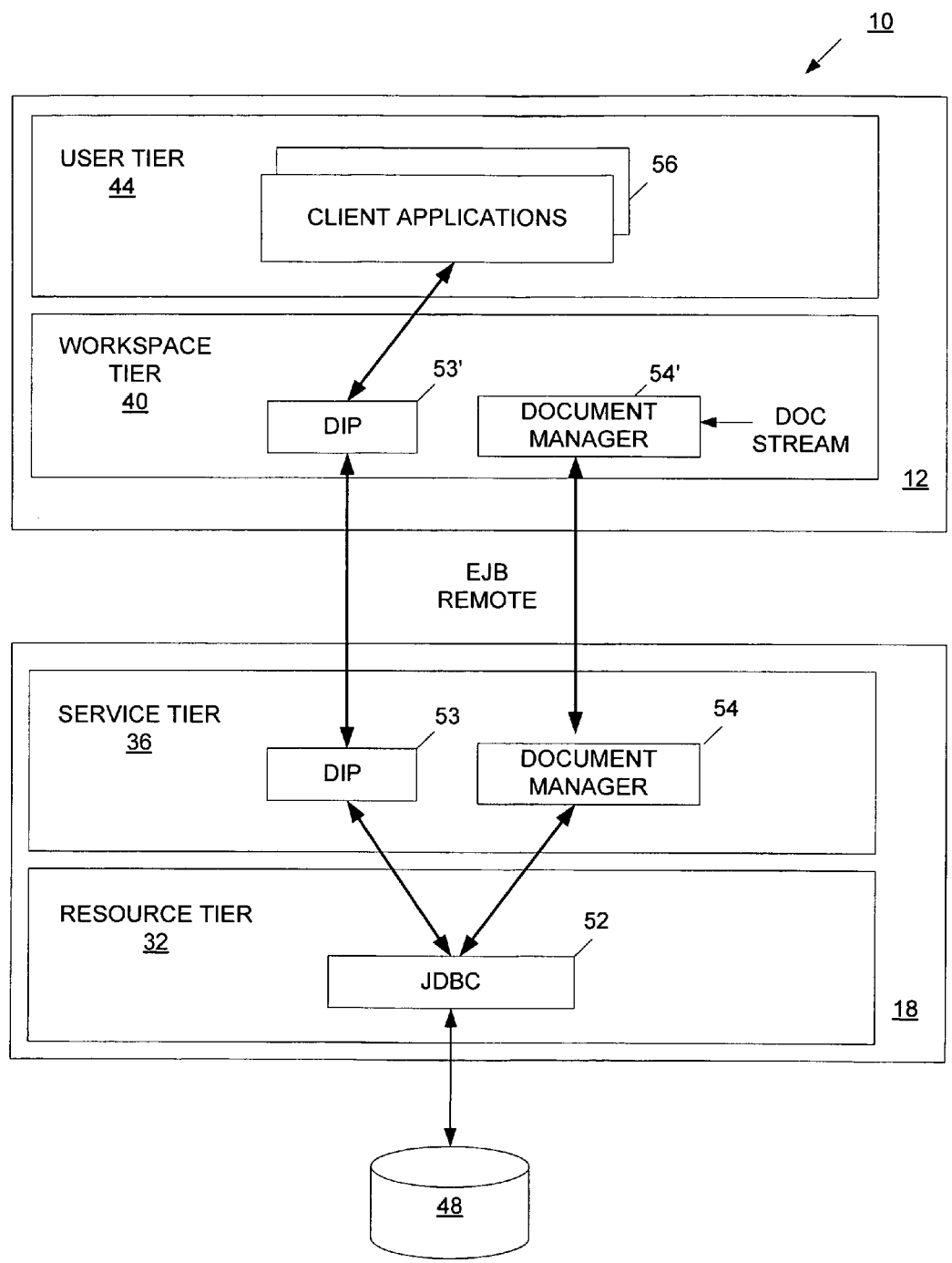
FIG. 1 is a block diagram of a client-server system in which a dynamic interest profile (DIP) system of the invention can be implemented.

FIG. 1 shows a client-server system 10 in which a dynamic interest profile (DIP) system of the present invention can be implemented. The client-server system 10 includes a client-computing device 12 in communication with a remote application server 18 (e.g., over a LAN, WAN). The client-computing device 12 has a processor, a user interface, a display screen, an input device (e.g., keyboard, a mouse, trackball, touch-pad, touch-screen, etc), and persistent storage for storing data and software programs. Exemplary embodiments of the client-computing device 12 include, but are not limited to, a personal computer (PC), a Macintosh computer, a workstation, laptop computer, a hand-held device such as a personal digital assistant (PDA) and a cellular phone, a network terminal, and an online gaming device such as Sony's PLAYSTATION™.

The application server 18 includes a Web server (not shown), i.e., a software program capable of servicing Hypertext Transport Protocol (HTTP) requests received from the client-computing device 12 over the network. In one embodiment, the application server 18 is a Java 2 Platform, Enterprise Edition (J2EE) application server. Core components of the J2EE platform are Enterprise JavaBeans (EJBs), maintained in an enterprise java bean (EJB) container. The application server 18 can be used to deploy, integrate, execute, and manage a variety of e-business applications. One exemplary implementation of the application server 18 is the Websphere® Application Server produced by IBM Corporation.

One of the enterprise java beans within the EJB container on the application server 18 provides a profile management system (not shown). The profile management system is a component of the application server 18 that produces a common schema of attributes for people, groups, organizations, and organizational units used by client application programs. The profile management system also can perform directory lookups and manages member profiles. The Web server is in communication with the profile management system for collaborating in the return of content to client applications executing on the client-computing device 12 in response to, e.g., an HTTP request. One exemplary implementation of the profile management system is the Websphere Memory Manager™ (WMM) produced by IBM Corporation.

In one embodiment, the DIP system of the invention is implemented as an enterprise business component based on the J2EE-recommended multi-tiered architecture. As shown, the architecture includes four tiers: a resource tier 32, a service tier 36, a workplace tier 40, and a user tier 44. The resource and service tiers 32, 36 are implemented on the application server 18; the workplace and user tiers 40, 44 are implemented on the client-computing device 12.

The resource tier 32 is in communication with a data store 48 (or repository) in which a DIP database (e.g., relational) is maintained. Storage of each persisted dynamic interest profile is in this DIP database. The resource tier 32 also has a Java Database Connectivity (JDBC) API 52 for retrieving DIP information (e.g., vectors) from and storing DIP information to the DIP database in the data store 48. The service tier 36 contains Enterprise Java Beans (EJB) 53, 54 for implementing DIP and document management operations, respectively. The service tier 36 communicates with the resource tier 32 to store vectors in and retrieve vectors from the DIP database, as described in more detail below.

At the client-computing device 12, the workspace tier 40 contains the client-side DIP 53' and document management components 54' corresponding to the server classes at the service tier 36. The workspace tier 40 is in communication with the service tier 36 at the application server 18 by way of an EJB remote interface. Client application programs 56 written to provide tailored program behavior based on a dynamic interests profile (DIP) of the user execute at the user tier 44. These client application programs 56 can be part of larger collaboration application program, e.g., one that integrates online work collaboration capabilities—such as e-mail, instant messaging, and Web conferencing—with business applications and portals. An exemplary implementation of the larger program can be Lotus Workplace®, produced by IBM/Lotus Corporation of Cambridge, Mass. The document manager component 54' of the workspace tier 40 receives documents in a document stream produced by the online collaboration application and forwards these documents to the corresponding document manager component 54 at the service tier 36. The client application programs 56 at the user tier 44 communicate with DIP component 53' at the workspace tier 40 to perform DIP functionality.

The DIP system of the invention can support online and offline operation. For online operation, the server-side software components perform the various DIP calculations, described below, on the user's set of personal documents. For offline operation, client-side software components perform these DIP calculations locally on the client-computing device 12 on a smaller set of personal documents.

Figure 2:
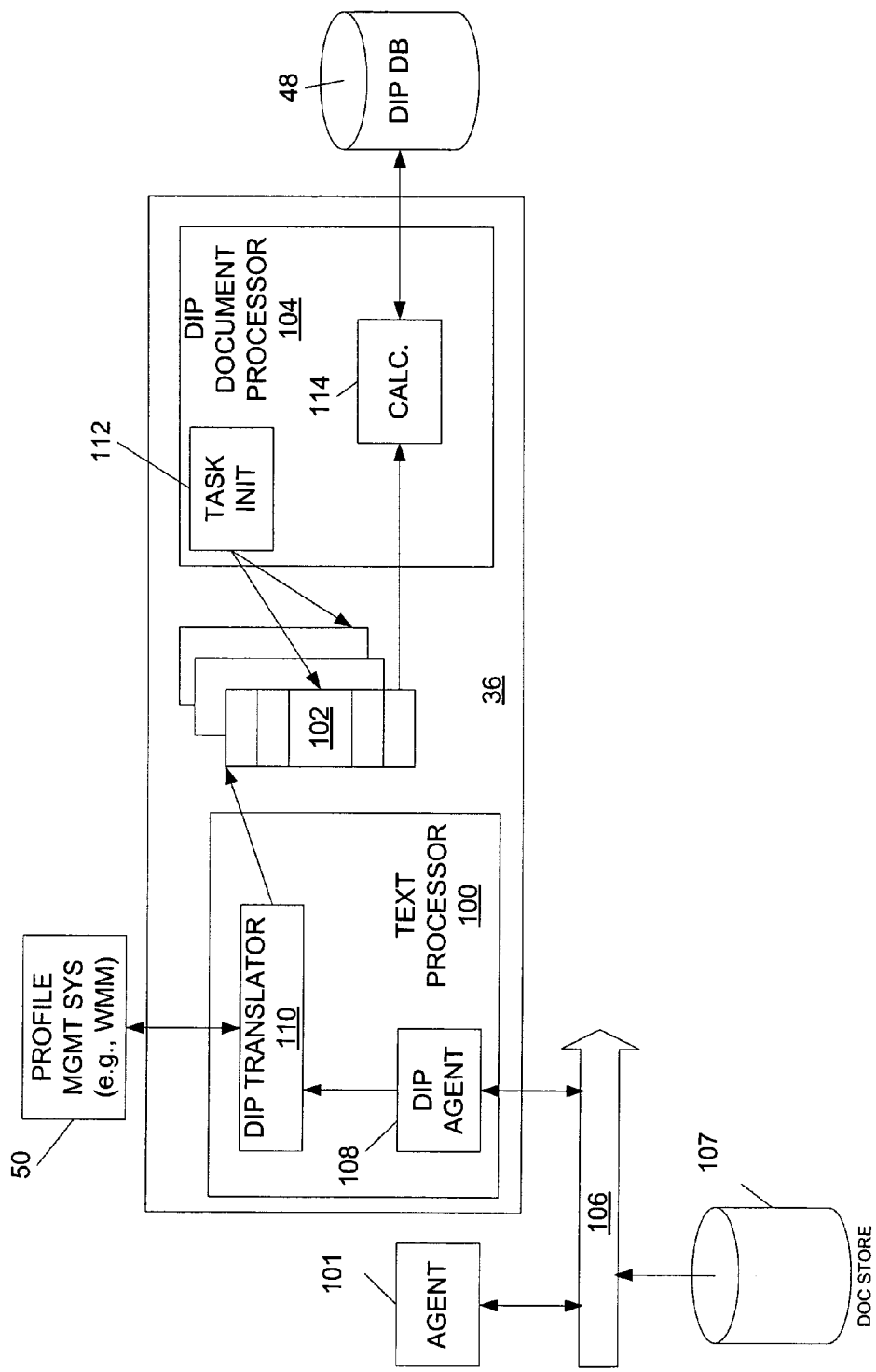
FIG. 2 is a block diagram of an embodiment of the service tier including various server-side programs for implementing the DIP functionality.

FIG. 2 shows an overview of one embodiment of the service tier 36 of the DIP system including various server-side software components. The components include a text processor 100, a plurality of document queues 102, and a DIP document processor 104. The text processor 100 is in communication with a document stream 106, the document queues 102, and the profile management system 50 described in FIG. 1. There is one document queue 102 for each user of the DIP system. The DIP document processor 104 is also in communication with the document queues 102 and with the DIP database in the data store 48.

The text processor 100 includes a DIP agent 108 and a DIP translator 110. The DIP agent 108 is in communication with the document stream 106 and with the DIP translator 110, and the DIP translator 110 is in communication with the document queues 102 and with the profile management system 50. The DIP agent 108 is one of a plurality of pipelined processing agents operating on a document stream 106. Other processing agents (e.g., agent 101) can include mail transfer agents and instant messaging agents. In general, processing agents perform specific tasks, such as indexing documents for searches, flagging documents that contain a virus. The DIP document processor 104 includes a task initiator 112 and a calculator 114. The task initiator 112 and the calculator 114 are in communication with the document queues 102. The calculator 114 is also in communication with the DIP database in the data repository 48 (through software components of the resource tier 32).

Documents on the document stream 106 originate from a variety of applications including, but not limited to, email, calendaring and scheduling, and instant messaging, and can be maintained in one or more messaging repositories 107 at the application server 18. A flag may be associated with each document indicating whether an application has added that document to, deleted the document from, or modified the document in its corresponding data repository.

Figure 3:
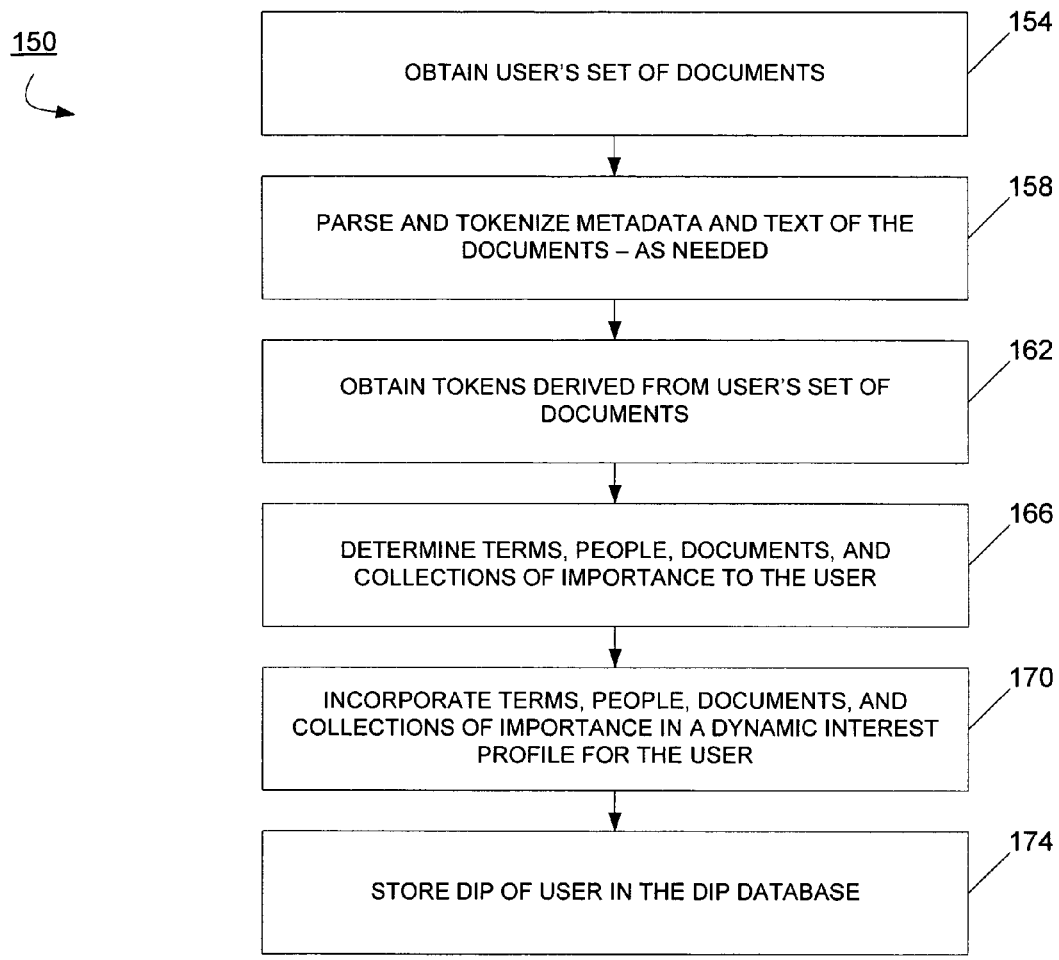
FIG. 3 is a flow diagram of an embodiment of a process for generating a DIP in accordance with the principles of the invention.

FIG. 3 shows an overview of an embodiment of a process 150 for generating a DIP for tracking the personal interests of a user. At step 154, the text processor 100 obtains a set of documents of a user. The text processor 100 parses (step 158) the text and metadata in the documents, producing tokens, as needed, relating to terms, people, documents, and collections. The DIP document processor 104 obtains (step 162) the various tokens from the text processor 100 (e.g., through the queues 102) and determines (step 166), using various functions and statistical methods, which terms, people, documents, and collections are of overall importance and, optionally, of emerging importance to the user. At step 170, the identity of these terms, people, documents, and collections of importance become part of the dynamic interest profile of the user. This profile is stored (step 174) in the DIP database in the data repository 48. The process 150 executes for each user of the DIP system. Accordingly, the DIP database can maintain the dynamic interest profile of each member of an organization.

More specifically, during operation of the DIP system, the DIP agent 108 monitors the document stream 106 for detecting changes, i.e., additions, deletions, modifications to each user's set of documents that can affect the dynamic interest profiles of that user. Because the DIP agent 108 is in a pipeline, the DIP agent 108 can immediately copy a document and return the original document to the document stream for downstream processing. The flags associated with the documents enable the DIP agent 108 to identify the appropriate actions (i.e., add, delete, modify) to be taken.

Some of these actions result in changes to DIPs in the DIP database, others actions cause documents to be removed from consideration. For example, an email sent by person A to person B with a carbon copy to person C generates three new documents (but not necessarily on the same mail system). The DIP agent 108 tags these documents to indicate with which person (or group) such documents are associated so that their translated versions arrive at the appropriate document queues 102. As another example, users typically immediately delete spam that has eluded a spam filter from an inbox. (Efficient spam filters can help keep DIPs accurate). The DIP agent 108 may be able to detect deletion of this email, and cause any corresponding previously added document to be removed from a queue before that spam email becomes incorporated in an interest profile.

In one embodiment, the DIP agent 108 also tags documents with information (e.g., a score) indicative of, e.g., the importance of the sender, of the text, or of an aggregated overall score. Such tagging provides a snapshot of the importance calculated when the DIP agent 108 initially receives the document. This importance can change when the underlying interest profile is updated. Recalling the importance of a particular document upon its receipt can provide useful information.

The DIP agent 108 forwards documents (or copies thereof) obtained from the document stream 106 to the DIP translator 110. In general, the DIP translator 110 translates each document from its particular format into a DIP document format. To perform this translation, the DIP translator 110 parses the documents and extracts and tokenizes information about people from various fields within the document, preserving relationships that exist between documents and people. For example, higher importance can be given to a person on the "to:" list of an email than to a person on the "cc:" list. The DIP translator 110 also tokenizes terms encountered in title, header, or subject fields and in the body of documents into a set of unique tokens. Sets of unique tokens are maintained for each field that is deemed relevant for the constructing of interest profiles. The DIP translator 110 also keeps any source collection information included in the original document.

In addition, for email documents, people are represented by their email addresses, which can give rise to ambiguity because multiple email addresses can map to one email account, and thus to one person. The DIP translator 110 communicates with the profile management system 50, which maintains unique IDs of persons. The DIP translator 110 attempts to normalize email addresses to the appropriate unique IDs to resolve any ambiguity.

The DIP translator 110 then places the translated document onto one of the plurality of internal document queues 102. There being one document queue 102 for each unique person assists in the task of batching documents. DIP documents remain in the document queue 102 until the task initiator 112 polls the queues, one queue at a time, for changes. The task initiator 112 is programmable to poll the queues 102 periodically, to update the DIP database.

When the task initiator 112 detects a change in a document queue 102, the DIP documents in the queue 102 pass to the calculator 114 of the DIP document processor 104 (e.g., in FIFO fashion). A many-to-one mapping exists between documents and interest profiles. This mapping enables the DIP document processor 104 to update one interest profile at a time by batching documents together. With email as an example, a batch can contain all emails sent by or received by an author during the period since the last DIP update.

Based on the information in these DIP documents, the calculator 114 determines items that are of importance to a particular user, by computing scores indicative of the strength of various relationships between the user and other persons. In one embodiment, the calculator 114 computes (1) term importance; (2) people importance; (3) document importance, and (4) collection importance, or any combination thereof, as described in more detail below. In addition, the calculator 114 can also determine an emerging term importance, people importance, document importance, collection importance, or any combination thereof. With this importance information, the calculator builds or updates a corresponding set of delta vectors, also referred to as feature vectors, used to update incrementally the underlying interest profile. The delta vectors enable the tracking of SQL inserts, deletes, and updates needed to incorporate the queued set of documents into a DIP.

The calculator 114 processes batches of documents and performs the various calculations in local memory before any updates are written to the DIPs in the DIP database. To ensure database consistency, the DIP document processor 104 treats all updates to an interest profile as a single (i.e., atomic) transaction.

Term Importance

In general, terms are words and phrases that convey meaning in documents of a user. Well known in the art are techniques for parsing documents to find terms. An identified term is a term of importance to a user if that term has the following properties: (1) the term is associated with the user; (2) the term has descriptive value; (3) the term has discriminative value; and (4) the term has current relevance. In one embodiment, the DIP system considers the subject (title, header) and body of a document as a set of terms (i.e., the DIP system does not take the order of words or their frequency of occurrence within the document into consideration).

Various component functions contribute to the calculation of the importance of a particular term. Such functions include (1) a user function, (2) a subject function, (3) a folder function, and (4) a time function. Each of these functions corresponds to a respective one of the properties used to determine the importance of a term.

The user function ($f_{user}$) scores a term that is associated with the user higher than an unassociated or less associated term. This property of the user function is expressible as $f_{user}(term_1) > f_{user}(term_2)$ when term1 is more associated with the user than term2. To calculate fuser, it is advantageous to have a notion of the general frequency of use of a term to serve as a point of reference. To determine this general frequency, the DIP system maintains an organizational "background vector" that contains the number of occurrences each individual term has appeared overall in an organization's email. The background vector contains shared information (i.e., by each user of the DIP system). In systems where security is a concern, this organizational background vector is replaceable with a vector based on the general frequency of words within the language being used.

In general, the background vector resides on the application server 18. A copy of the background vector passes to the client-computing device 14 whenever the client goes online. When the client 14 is offline, the background vector improves the accuracy of the term importance calculation. The client 14 tracks local changes to the background vector and updates the shared version of the background vector upon returning online.

The subject function ($f_{subject}$) scores a term higher if the term is common in the subject of documents. This function characterizes the descriptiveness of the term. This property of the subject function is expressible as $f_{subject}(term_1) > f_{subject}(term_2)$ when term1 is more associated with the subjects of documents than term2, and is thus deemed more descriptive. As used herein, "subject" can also refer to a title or header, depending upon the type of document. For example, email messages have subject fields, word-processing documents have title metadata.

The folder function ($f_{folder}$) characterizes a distinctiveness of a term (i.e., the ability of a term to help discriminate between topics). This function places a score on a term based on how useful that term is for distinguishing between different collections (e.g., folders). Higher scores are given to more distinguishing terms: for instance, $f_{folder}(term_1) > f_{folder}(term_2)$ when term1 provides a more useful indicator than term2 for finding a folder in which a document containing that term resides.

The time function ($f_{time}$) scores a term associated with a recent period (e.g., within the last year) higher than a term with a more distant temporal association. This property of the time function is expressible as $f_{time}(term_1) > f_{time}(term_2)$ when term1 is more associated with the current time period than the term2, and is thus deemed more relevant.

In one embodiment, the functions are implemented as follows (where $C_{t,x}$ is the number of occurrences of term t in set x of user's documents and I(x,y) is the point-wise mutual information between x and y:

$f_{user}: f_{user} = \max[0, I(t, \text{user}) \log C_{tuser}]$;

$f_{subject}: f_{subject} = \max[0, I(t, \text{subject}) \log C_{tsubject}]$;

$f_{folder}: f_{folder} = \max[0, I(t, f) \log C_{tfolder}]$, where $f$ belongs to the set of Folders;

$f_{time}: f_{time} = \max[0, I(t, \text{curPeriod}) \log C_{tcurperiod}]$, where e.g., curPeriod is the last 52 weeks counting back from the day of the calculation.

Point-wise mutual information, I(x,y), is an indication of how informative one variable's value x is about the value of another variable y. A positive number indicates that X=x is positively correlated with Y=y. The equation for point-wise mutual information is $I(x,y) = \log(p(x, y)/p(x)p(y))$.

To calculate the importance of a term t, one embodiment performs a weighted linear combination of the component functions in accordance with the following equation: score $(t) = \lambda_1 f_{user} + \lambda_2 f_{subject} + \lambda_3 f_{folder} + \lambda_4 f_{time}$, where $\lambda_1$, $\lambda_2$, $\lambda_3$, and $\lambda_4$ are weights associated with the individual functions. Other embodiments can employ fewer or more than these particular functions to calculate the importance of a term. For example, the emerging importance of a term can be included as a weighted function in this importance calculation.

People Importance

In general, the importance of a person to a user is based on the relationship between the user and that person as indicated by the user's email. Of most importance to a user are those people with whom the user has the strongest relationships. In one embodiment, the strength of a relationship is based on the following relationship attributes: (1) longevity, (2) currency, (3) reciprocity, (4) exclusivity, and (5) frequency.

Various component functions contribute to the calculation of the importance of a particular person. Such functions include (1) a longevity function, (2) a currency function, (3) a reciprocity function, (4) an exclusivity function, and (5) a frequency function. Each of these functions corresponds to a respective one of the attributes used to determine the importance of a person to a user.

The longevity function ($f_{longevity}$) evaluates the importance of a person based on longevity of the relationship between the person and the user. More value (i.e., importance) is attributed to longer relationships. The longevity function operates such that $f_{longevity}(p_1) > f_{longevity}(p_2)$ when person p1 has older interactions with the user than person p2.

The currency function ($f_{current}$) evaluates importance based on the currency (i.e., recency) of the relationship between the person and the user, with more value being assigned to current relationships than to less recently active relationships. This ranking of importance is expressible as $f_{current}(p_1) > f_{current}(p_2)$ when person p1 has more recent interactions with the user than person p2.

The reciprocity function ($f_{reciprocity}$) evaluates importance based on the number of exchanged email communications between the user and the person. Reciprocity is essentially a ratio of the numbers of documents sent to and received from a particular user. This function assigns more importance to a person to whom the user sends a greater number of email messages than to persons to whom the user sends fewer email messages. This ranking is expressible as $f_{reciprocity}(Sp_1, Rp_1) > f_{reciprocity}(Sp_2, Rp_2)$ when person p1 has more bidirectional interactions with the user than person p2, where $S_p$=the set of communications sent to person (p), and $R_p$=the set of communications received from person (p). For example, consider a user who sends 1000 documents to a particular person p1 and receives 1000 documents from that person. The user and person p1 have a strong reciprocal relationship. In comparison, if the user sends 2000 documents to person p2, but receives 0 documents in return, the user and person p2 have a weak reciprocal relationship, although the total number of documents in both examples is the same (i.e., 2000).

The exclusivity function ($f_{exclusivity}$) evaluates importance based on the number of exclusive communications between the person and the user (i.e., email messages between these two parties only). More value is associated with a higher number of such exclusive communications: $f_{exclusivity}(p_1) > f_{exclusivity}(p_2)$ when person p1 has more exclusive interactions with the user than person p2. An exemplary equation for computing a measure of exclusivity for a person (p) is $f_{exclusivity}(p) = f_{1:1}(p)/(|S_p|+|R_p|)$, where $S_p$=the set of communications sent to person (p), $R_p$=the set of communications received from person (p), and $f_{1:1}(p)$=the number of one-on-one interactions between the user and person (p).

The frequency function ($f_{frequency}$) values importance based on the total number of emails exchanged between the person and the user. Of more importance are persons who have exchanged a greater total number of email messages, expressed as follows: $f_{frequency}(p_1) > f_{frequency}(p_2)$ when person p1 has exchanged more email messages with the user than person p2. An equation for computing frequency for a person (p) is $f_{frequency}=|S_p|+|R_p|$, where $S_p$=the set of communications sent to person (p) and $R_p$=the set of communications received from person (p).

To calculate the importance of a person p, one embodiment performs a weighted linear combination of component functions in accordance with the following equation: score(p)= $\lambda_1 f_{length} + \lambda_2 f_{current} + \lambda_3 f_{reciprocity} + \lambda_4 f_{exclusivity} + \lambda_5 f_{frequency}$, where $\lambda_1, \lambda_2, \lambda_3, \lambda_4$, and $\lambda_5$ are weights associated with the individual functions. Other embodiments can employ fewer or more than these particular functions to calculate the importance of a person. Again, for example, the emerging importance of a person can be included as a weighted function in this importance calculation. Combinations of fewer than all of these functions are applying, in effect, a weight factor equal to zero on the unused functions.

Document Importance

Documents are the basic unit in the PIM system of the invention. Types of documents include calendar entries, email messages, word processing documents, presentations, scanned documents. Other types of documents can be used without departing from the principles of the invention. The importance of a document to a user is, in one embodiment, based on properties that can be placed into three categories: (1) document metadata (e.g., authorship, routing, thread membership), (2) document content, and (3) user access patterns for the document. Document importance is dependent upon other DIP calculations, namely people and term importance.

Various component functions contribute to the calculation of the importance of a document to a user. Such functions include (1) a metadata function, (2) a contents function, and (3) a usage function. Each of these functions corresponds to a respective one of the properties used to determine the importance of a document.

The metadata function evaluates importance based on the sender (i.e., author) and recipients (if the document is an email) and their DIP scores. In one embodiment, this function is expressible as:

$$f_{meta} = \lambda_1 \text{ score(sender)} + \lambda_2 \frac{1}{|ToList|} \sum_{r \in ToList} \text{score}(r)$$

where $\lambda 1$ and $\lambda 2$ are weighting values, ToList is the set of recipients of the document, and the user, for whom document importance is being determined, has the highest importance score.

The contents function evaluates importance based on the contents of the document—including subject and body—and the DIP scores of the terms (Subject and BodyTerms) in the document. In one embodiment, the contents function is expressible as:

$$f_{contents} = \lambda_1 \max_{t \in Subject} [\text{score}(t)] + \lambda_2 \frac{1}{|BodyTerms|} \sum_{t \in BodyTerms} \text{score}(t)$$

where $\lambda 1$ and $\lambda 2$ are weighting values, where Subject is the set of terms in the subject, and BodyTerms is the set of terms in the document body.

This equation for the contents function averages the importance of the body terms and takes the maximum of the subject term importance when calculating document importance. Accordingly, the contents function accounts for the differing content of the document subject and the document body. The document subject or title tends to contain one or two key terms that describe the document, whereas the other terms serve as filler. Thus, averaging the importance of all terms in the title can lead to inaccurate comparisons. For instance, if "golf" is an important term, a document titled "Improving your Golf" is not considered less important than a document titled "Golf". In contrast, document bodies tend to contain similar numbers of filler words because authors generally write such documents in prose. Consequently, averaging the importance of terms in document bodies can produce comparable results among documents.

One embodiment of the usage function ($f_{usage}$) evaluates document importance based on the frequency of access to the document by the user, with more value being assigned to documents of higher access frequency. This ranking of importance is expressible as $f_{usage}(d_1) > f_{usage}(d_2)$ when document d1 has been more frequently accessed than document d2.

An exemplary calculation of the importance of a document d employs a weighted linear combination of component functions in accordance with the following equation: score(d)= $\lambda_3 f_{meta} + \lambda_4 f_{contents} + \lambda_5 f_{usage}$, where $\lambda_3, \lambda_4$, and $\lambda_5$ are weights associated with the individual functions. The equation used to calculate importance can be based on the type of document.

Collection Importance

Collections may be of varying types, ranging from email folders to public discussion databases. Accordingly, particular embodiments of collections depend upon the specific PIM system being used. In general, the attributes of a collection for indicating importance include collection content (i.e., importance of documents in the collection) and usage (frequency of access and frequency of modification of the collection). For some collections, metadata about the collection may also be important. Similar to calculations of document importance, calculations for discovering collection importance are dependent on other DIP calculations.

The component functions for calculating collection importance include an access function ($f_{access}$) and a change function ($f_{change}$). The access function $f_{access}$ assigns greater value (i.e., importance) to collections that are more frequently accessed by the user, as illustrated by the expression: $f_{access}(c_1) > f_{access}(c_2)$ when the user accesses the collection c1 more often than the collection c2. The change function $f_{change}$ assigns greater value to collections that the user modifies frequently. The following expression illustrates the operative property of the change function: $f_{change}(c_1) > f_{change}(c_2)$ when the user modifies the collection c1 more often than the collection c2.

The general form of the calculation of the importance of a collection c is:

$$\text{score}(c) = \lambda_1 f_{access} + \lambda_2 f_{change} + \frac{\lambda_3}{|D_c|} \sum_{d \in D_c} \text{score}(d)$$

where $D_c$ is the set of documents in collection c, $\lambda_1$, $\lambda_2$, and $\lambda_3$ are weights associated with the individual functions. Note that the document score, score(d), incorporates term importance and people importance and, thus, reflects the frequency of important people and important terms in the collection.

Emerging Importance

In some embodiments, the DIP system identifies terms, persons, documents, collections, or combinations thereof that are of emerging importance. Items of emerging importance can differ from items of overall importance (i.e., over all time). To detect an item of emerging importance, the DIP system calculates the strength of association of the item during the recent time period using, for example, point-wise mutual information, Chi-Squared, or some equivalent statistical test. For terms and people, the number of references to the person or term is used for this calculation. For collections, the frequency of access and modification by the user is used. For example, the general equation for detecting the extent to which a item x is of emerging importance is: emerge(x)=A(x, t) Cx, where t is the current time period, A(x, t) is the strength of association between x and t, and Cx is the frequency of the item x.

Feature and Score Vectors

The DIP system of the invention is dynamic and periodically performs recalculations. In the DIP system, the recalculation of importance and emerging importance scores occurs efficiently by avoiding a reexamination of the entire corpus of documents, a potentially time and resource consuming operation, whenever recalculations of the various functions occur. To allow for efficient recalculation, the DIP system stores intermediate results, in the form of feature vectors, which hold aggregate information and from which the final importance score calculations are derived.

A feature vector is a vector or set of tokens or keys (e.g., names, terms) each associated with a count or a score. Feature vectors represent those intermediate parts of a calculation that incrementally change when documents are created, deleted, or modified. After recalculating the various DIP scores (i.e., score(t), score(p), score(d), score(c)), the DIP system stores the results as importance score vectors representing the importance of the DIP entities to the user. Importance Score vectors are sets of tokens associated with a floating-point score. The dynamic interest profile of a user comprises the combination of feature and importance score vectors. Profiles are extensible: features can be added as needed. Feature vectors enable recalculation based on the delta in the corpus of documents corpus. Additionally, the DIP system stores document presence vectors in order to update the score vectors and make document specific calculations.

The following description of feature vectors and importance score vectors illustrates one exemplary embodiment of the present invention. Other types of feature vectors and importance score vectors can be used in the practice of the invention. Vectors (feature and importance score) can be organized into three categories of vectors: Term Vectors; Document Vectors; and Person Vectors.

Term vectors include (1) Term Importance (Score) Vectors, (2) a Background (Feature) Vector, (3) User Term Occurrence (Feature) Vectors, (4) Subject Term Occurrence (Feature) Vectors, (5) Week Term Occurrence (Feature) Vectors. Each user of the DIP system has an associated one Term Importance Score Vector. This vector is a cached result of the plurality of terms of importance to the particular user, and can include tens of thousands of terms (e.g., ~25,000).

There is one Background Vector for the DIP system used to represent the organizational background (or standard) for providing a basis of calculating term importance (and dependent document importance). This vector can include hundreds of thousands of terms (e.g., ~300,000).

The User Term Occurrence Vector, for which there is one per user, represents the frequency of term occurrence in the user's personal documents. The calculation of term importance uses this vector, which can include tens of thousands of terms (e.g., ~25,000).

The Subject Term Occurrence Vector, also used in the calculation of term importance and for which there is one such vector per user, represents the frequency of term occurrence in the subject or title of a user's personal documents. The vector can include thousands of terms (e.g., ~3,000).

The calculation of term importance may also use the Week Term Occurrence Vector for representing the frequency of a given term for a particular week. There is one such vector for each user for a particular week, provided email exists for that week. The average size of this vector can be approximately 1500 terms. Counts computed from documents processed during a limited timeframe (i.e., over a short recent time span) can be more informative than the global (overall) vectors because these limited timeframe vectors incorporate a recency factor into the calculations, and thus allow applications to track how interests change over time.

Document vectors include Document Feature Vectors, one such vector for each document. Each Document Feature Vector stores one entry for each different term that occurs in the associated document. The DIP system uses this document vector to update the importance score term vector and to calculate document importance. The average size of Document Feature Vectors can be ~150 terms. These vectors may expire after a predetermined period in order to save storage.

Person vectors include (1) Person Importance (Score) Vectors, (2) Sent-To (Feature) Vectors, (3) Received-From (Feature) Vectors, (4) Week Sent-To (Feature) Vectors, and (5) Week Received-From (Feature) Vectors. Each user of the DIP system has an associated Person Importance Score Vector. This vector is a cached result of the plurality of scores for each person of importance to the particular user. Person Importance Score Vectors can average in size of approximately 150 entries (depending upon email usage patterns).

Each user also has an associated Sent-To Vector that stores the number of email messages sent by that user to each given person (identified by a unique user identifier or UID). The DIP system uses this vector to calculate people importance (and the dependent document importance). Each vector can include approximately 100 entries, depending upon the user's email usage pattern.

Each user has an associated Received-From Vector that stores the number of email messages received by that user from each given person (again, identified by a UID). This vector contributes to the calculation of the people importance and the dependent document importance, and can include approximately 500 entries, depending upon the email usage pattern.

Each user has an associated Week Sent-To Vector that stores the number of email messages sent by a given user to each person in a given week. The DIP system can use this vector to calculate emerging people importance (and the dependent document importance). Each vector can include approximately 10 entries, depending upon the user's email usage pattern.

Each user also has an associated Week Received-From Vector that stores the number of email messages received by a given user from each person in a given week. The DIP system can use this vector to calculate emerging people importance (and the dependent document importance). Each vector can include approximately 20 entries, depending upon the user's email usage pattern.

Figure 4:
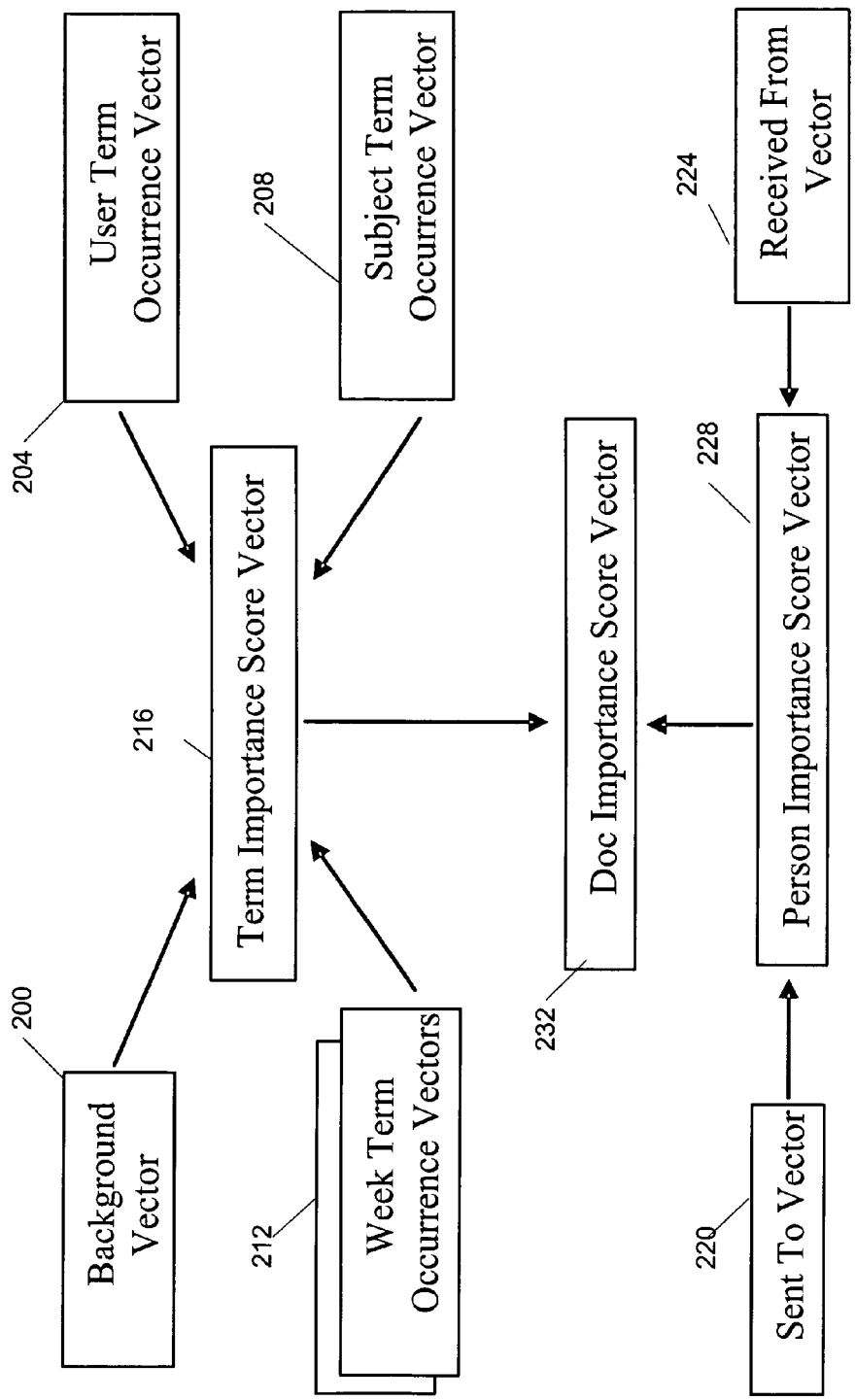
FIG. 4 a block diagram illustrating one embodiment of computational dependencies among the various vectors used in the construction and updating of DIPs.

FIG. 4 shows a diagram illustrating the computational dependencies among the various vectors. The Background Vector 200, User Term Occurrence Vector 204, Subject Term Occurrence Vector 208, and Week Term Occurrence Vector 212 contribute to the calculation of the Term Importance Score Vector 216 for a particular user. The Sent-To Vector 220 and the Received-From Vector 224 contribute to calculating the People Importance Score Vector 228 for a particular user. The Document Importance Score Vector 232 is calculated from the Term Importance Score 216 and the People Importance Score Vector 228.

The various vectors are stored in a database in the DIP repository. An exemplary schema for the DIP database includes a first generic feature vector table (called COUNTVEC) containing tokens and integer counts and a second generic feature vector table (called FEATUREVEC) containing tokens and a double-value scalar. The COUNTVEC and FEATUREVEC tables maintain counts and scores, respectively. Constructed according to the COUNTVEC table are the Background Vector, Term Occurrence Vectors, and Sent-To and Received-From Vectors. Columns of the COUNTVEC table include user ID (USERID), vector ID (VECID), term (TERM), and count (COUNT). Included in the FEATUREVEC table are the term, people, and document importance score vector. Columns of the FEATUREVEC table include USERID, VECID, TERM, and scalar (SCALAR). Unique identifiers are used to represent the people. These identifiers are stored in the USERID and TERM fields, and are based on a function of the profile management system identifier and type of directory (e.g., personal address book (PAB), Corporate Directory, or neither).

Other tables in the database schema include a feature table, called DOCVEC, for document presence vectors, a DOCUMENT table for document timestamps, and a USERSTATS table for user-specific statistics used in DIP calculations. Column fields for the DOCVEC table include a document ID field (DOCID) and the TERM field. The DOCUMENT table includes a DOCID field and a TIMESTAMP field. Columns of the USERSTATS table include USERID, term count (TERMCOUNT), subject count (SUBJCOUNT), and document count (DOCCOUNT).

The various feature, score, and document presence vectors are persisted in the relational DIP database (e.g., DB2 UDB™) in a table having the appropriate number of columns. To optimize for quick retrieval of vector information, a B-tree index based on the user ID and vector ID can be maintained. The tables are read-only during much of the operation of the DIP system, thus minimizing lock contention and maximizing concurrency. While the vectors in the DIP database are being updated, described hereafter, application programs attempting to query the DIP database wait until the update is complete.

Figure 5A:
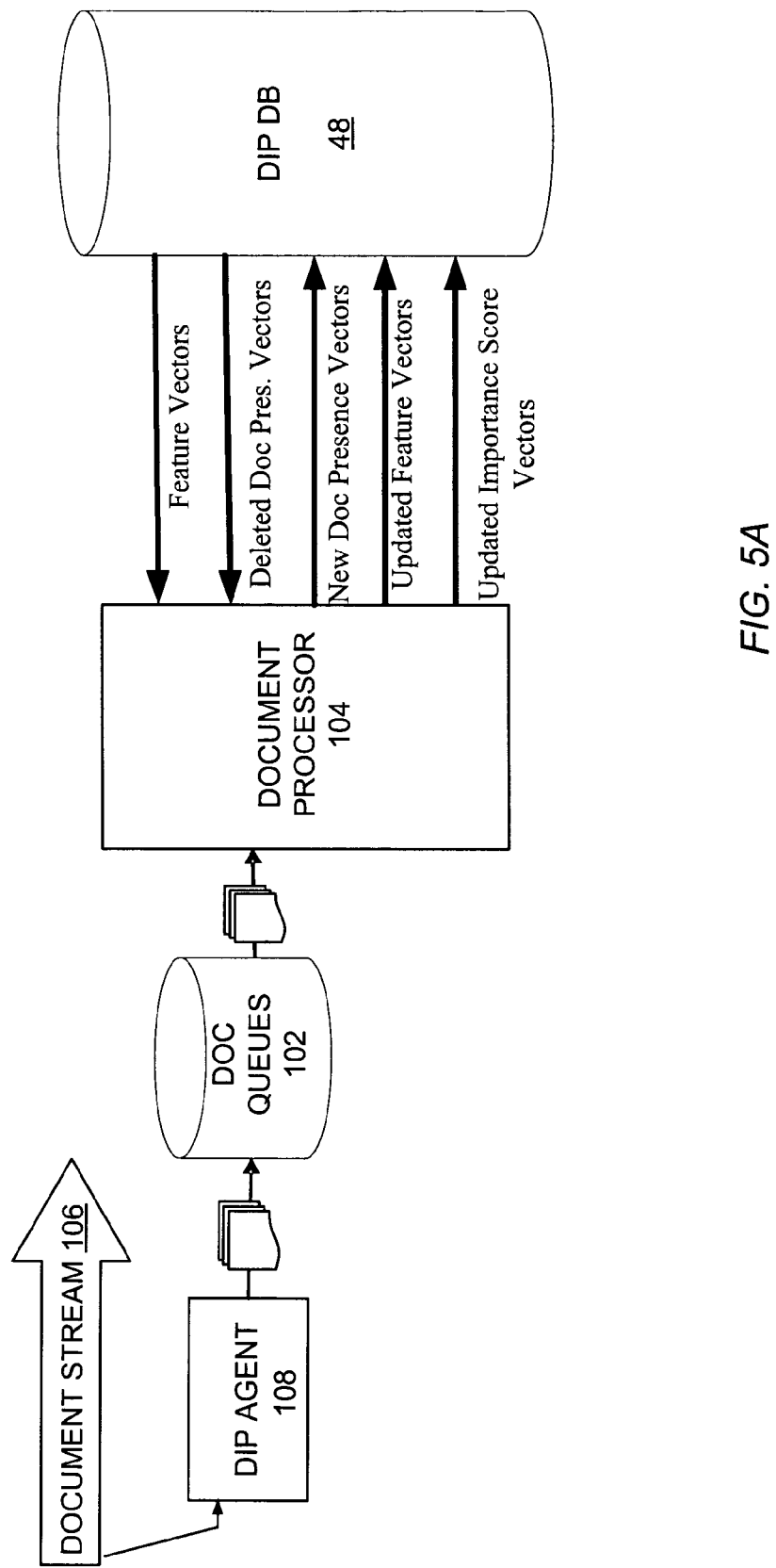
FIG. 5A is a block diagram of an embodiment of a process for updating the DIP database in accordance with the principles of the invention.

FIG. 5A shows a block diagram illustrating the directional flow of vectors during updates of the DIP database in accordance with the principles of the invention. To keep importance scores current, the DIP system remains abreast of changes to the user's set of documents. The DIP agent 108 monitors the document stream 106 for changes (detected by a "spider" mechanism). The stream of changes indicates when documents are added, deleted, or modified. The DIP agent 108 places detected changes onto one of the document queue 102. Periodically, the DIP database is updated to reflect the changes placed on the processing queue 102. During the update process, the DIP document processor 104 reads previously stored incremental feature vectors and document presence vectors from the data store 48 and writes modified incremental feature vectors, updated importance score vectors, and, potentially, new document presence vectors to the data store 48.

Figure 5B:
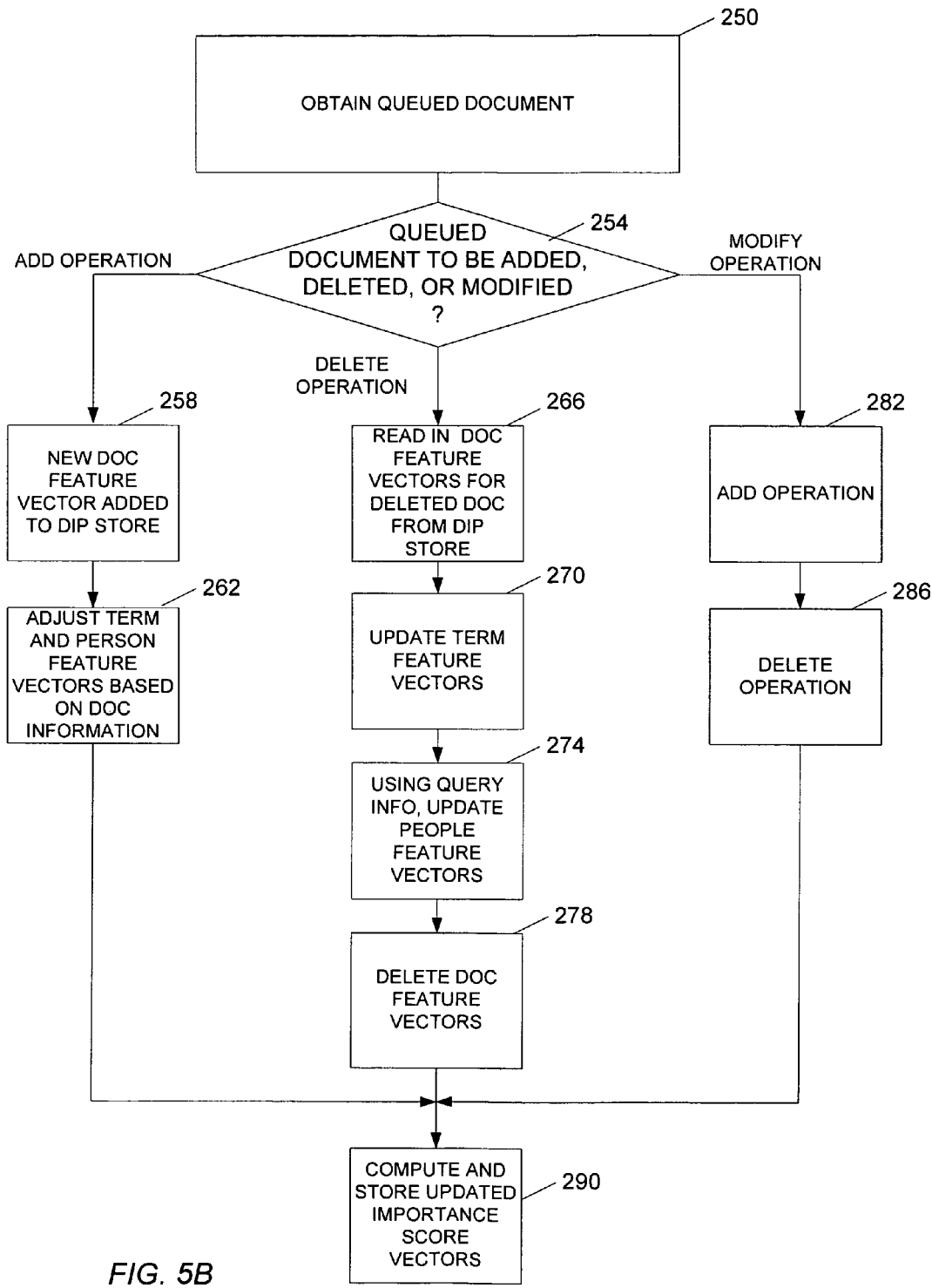
FIG. 5B is a flow diagram of an embodiment of a process for updating the DIP database in accordance with the principles of the invention.

FIG. 5B shows an embodiment of a process for updating the DIP. At step 250, the document processor 104 accesses the document queue 102 to retrieve and process a queued DIP document. The document processor 104 can be programmed to access the document queue periodically, e.g., every 15 minutes. From the queued DIP document, the document processor 104 determines (step 254) whether a new document is being added to the user's set of documents, or if an existing document is being modified or deleted. If the queued DIP document relates to a new document, the document processor 104 produces (step 258) a new document feature vector and updates (step 262) each term and person feature vector based on terms and people identified in the new document.

If the queued DIP document relates to a deleted document, the document processor 104 reads (step 266) the document feature vector for the deleted document from the DIP database. Based on the information in this document feature vector, at step 270 the term feature vectors are updated accordingly. With query information, the people feature vectors are also updated (step 274). Then the document processor 104 deletes (step 278) the document feature vector from the DIP database.

If the queued document relates to a modified document, the document processor 104 processes the modified document as a combined operation of adding new document and deleting the outdated version in the DIP database. Accordingly, the document processor 104 performs an add operation (step 282), comprised of steps 258 and 262, followed by a delete operation (step 286), comprised of steps 266, 270, 274 and 278.

The document processor 104 is also programmed to recalculate the importance scores periodically, e.g., daily. At step 290, the document processor 104 generates updated importance score vectors (i.e., term, person, and document) based on the current state of the various feature vectors and stores the update importance scores in the DIP database. To reduce the number of accesses to the DIP database and subsequent add and delete processing, the document processor 104 batches the updates into sets of documents for the same user and processes the updates in local memory (e.g., RAM) before updating the feature vectors and importance score vectors in the DIP database.

Figure 6:
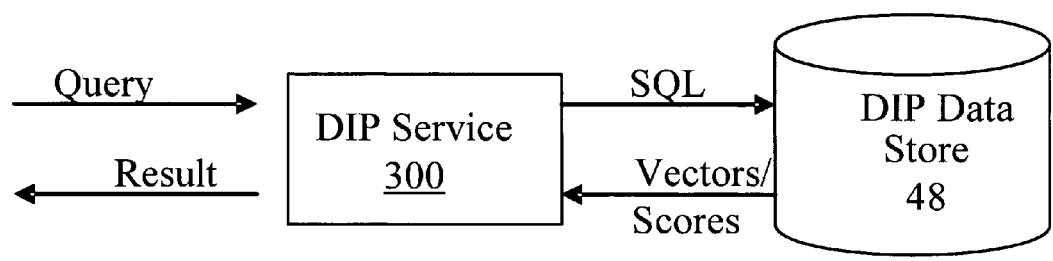
FIG. 6 is a block diagram illustrating an embodiment of a process by which an application program can access the DIP database of the invention.

FIG. 6 shows a general process by which an application program can access the DIP database of the invention. The importance scores within the DIP database are accessible through an application program interface (API) provided by a DIP Service 300. The API can include methods for accessing cached importance scores in the DIP database directly or for accessing the intermediate results (i.e., feature vectors) and dynamically calculating importance scores from the intermediate results.

For example, the API can have methods for obtaining the overall (and/or emerging) terms, people, and documents of importance in response to queries of the DIP database. The API can fulfill queries for finding terms of importance and people of importance by querying the Term Importance Score Vector and the People Importance Score Vector, respectively. Fulfilling queries to find documents of importance involves retrieving the document feature vector, the Term Importance Score Vector, and the People Importance Score Vector from the DIP database. Then, based on the Document Feature Vector and the submitted query, the term importance score for the document is calculated dynamically and returned to the application program in order to fulfill the request.

Programmers can thus produce application programs that use the API to build functionality based on users' dynamic interest profiles. Examples of such functionality include analyzing a user's email documents and calendar entries to calculate an overall importance of terms and people, to identify emerging terms and people, to associate terms with people, and to associate people with terms. The application programs can then apply these calculations to sort an email inbox by document importance, find people who are related to certain terms, and perform auto-completion of partially entered email addresses based on the persons of importance to the user.

A dynamic address book is another example of application program that can be built upon the capabilities of the DIP system. A dynamic address book for a user is an electronic address book that is automatically compiled from the most important people (according to the DIP of that user).

As another example, an application program can be developed to perform a search through the user's documents (e.g., email, word processing files) that ranks the search results based on the importance of those documents to the user (according to the user's DIP).

Because a DIP is generated from a user's personal document, privacy and security are key considerations. The DIP database tables can reside on the server and the DIP database protected by an administrator userID and password. In addition, the DIP data is not in a readable form. Only a unique identifier can be used to represent a person; that is, the names of people or userids of people (e.g., email addresses) are not stored in the database. Further, this unique identifier is a composite of two items, the profile management system identifier and the type of directory, which are not stored elsewhere in any one repository. Filters can be employed to identify and exclude documents that are not to be tracked for purposes of the DIP, such as email messages with persons of other domains (i.e., outside of the organization).

The present invention may be implemented as one or more computer-readable software programs embodied on or in one or more articles of manufacture. The article of manufacture can be, for example, any one or combination of a floppy disk, a hard disk, hard-disk drive, a CD-ROM, a DVD-ROM, a flash memory card, an EEPROM, an EPROM, a PROM, a RAM, a ROM, or a magnetic tape. In general, any standard or proprietary, programming or interpretive language can be used to produce the computer-readable software programs. Examples of such languages include C, C++, Pascal, JAVA, BASIC, Visual Basic, and Visual C++. The software programs may be stored on or in one or more articles of manufacture as source code, object code, interpretive code, or executable code.

Although the invention has been shown and described with reference to specific preferred embodiments, it should be understood by those skilled in the art that various changes in form and detail may be made therein without departing from the spirit and scope of the invention as defined by the following claims.

What is claimed is:

1. A method for tracking interests of users based on personal information, the method comprising:
   monitoring a stream of documents from more than one user to obtain therefrom a plurality of electronic documents each belonging to one of the users;
   generating, for each obtained electronic document, a dynamic interest profile (DIP) document based on information obtained from that electronic document;
   associating each generated DIP document with one of the plurality of users;
   uniquely assigning a document queue to each of the users;
   selecting, for each DIP document, one of the document queues into which to place that DIP document based on the user with which that DIP document is associated;
   polling each document queue to detect changes to that document queue;
   determining, in response to detecting a change to the document queue of each user, at least one person of importance to that user and one term of importance to that user based on the DIP documents in the document queue uniquely assigned to that user;
   generating an interest profile of each user that includes each person and each term of importance of that user; and
   storing the interest profiles of the users in a DIP database.

2. The method of claim 1, further comprising determining from the information obtained from a given electronic document at least one item of emerging importance to the user to whom that electronic document belongs.

3. The method of claim 1, wherein the plurality of electronic documents includes a combination of email messages and word processing documents.

4. The method of claim 1, wherein generating, for each obtained electronic document, a dynamic interest profile (DIP) document from information obtained from that electronic document includes parsing each electronic document to identify terms and people mentioned in that electronic document.

5. The method of claim 1, further comprising determining a document of importance to a given user based on at least one term of importance to the given user and on at least one person of importance to the given user.

6. The method of claim 1, further comprising determining a collection of importance to a given user based on at least one term of importance to the given user and on at least one person of importance to the given user.

7. The method of claim 1, wherein determining at least one person of importance to each user and one term of importance to each user includes calculating an importance score for a term in the electronic documents belonging to that user based on at least one of a strength of association of the term with that user, a strength of association of the term with subjects of documents, a discriminative quality of the term for identifying contents of a folder, and a relevance of the term to that user.

8. The method of claim 1, wherein determining at least one person of importance to each user and one term of importance to each user includes calculating an importance score for a person mentioned in the electronic documents belonging to that user based on at least one of a longevity of association between the person and that user, when that user most recently interacted with the person, a number of bidirectional interactions with the person, a measure of exclusive interactions with the person, and a frequency of interactions with the person.

9. The method of claim 1, wherein determining at least one person of importance to each user and one term of importance to each user includes calculating an importance score for a document in the electronic documents belonging to that user based on at least one of a frequency of access by that user to the document, an importance of an author of the document, an importance of each person receiving the document, an importance of terms in a subject of the document, an importance of terms in a body of the document.

10. The method of claim 1, wherein determining at least one person of importance to each user and one term of importance to each user includes calculating an importance score for a collection of electronic documents belonging to that user based on at least one of a frequency of access by that user to the collection, a frequency of change by that user of electronic documents in the collection, and an importance of documents in the collection.

11. The method of claim 1, further comprising:
updating incremental feature vectors for each user based on the information obtained from the plurality of electronic documents for that user;
storing the incremental feature vectors for each user in the DIP database;
periodically performing an importance calculation using the incremental feature vectors for each user, to update the interest profile of that user; and
storing the importance feature vectors for each user in the DIP database.

12. The method of claim 1, wherein the stream of documents includes electronic documents generated by each user and electronic documents received by each user from someone other than that user.

13. The method of claim 1, further comprising:
providing an application program interface (API) for use by application programs to access the interest profiles of the users in the DIP database;
receiving a query issued by an application program using the API to access the interest profile of a given user in the DIP database; and
responding to the query by supplying to the application program an importance score vector having information computed to be of importance to the given user.

14. The method of claim 1, wherein the polling of each document queue occurs periodically at a rate controllable by a programmable processor.

15. The method of claim 1, further comprising determining from a DIP document in the document queue assigned to a given user if a new electronic document is being added to the electronic documents associated with the given user, if an existing electronic document associated with the given user is being modified, or if an existing electronic document associated with the given user is being deleted.

16. The method of claim 1, further comprising detecting deletion by a given user of an electronic document and removing, from the document queue assigned to the given user, the DIP document generated from that electronic document prior to deletion.

17. The method of claim 1, further comprising maintaining the DIP database on a server that is accessible to the users through client devices in communication with the server over a network.

18. The method of claim 1, further comprising tagging the electronic documents to indicate with which user each of the electronic documents is associated in order to facilitate placing each DIP document generated from each of the tagged electronic documents in an appropriate one of the document queues.

19. The method of claim 1, wherein a given one of the electronic documents is an email message having an email address representing a given user, and further comprising mapping the email address to a unique identifier of the given user in order to facilitate placing the DIP document generated from the given electronic document in the document queue assigned to the given user.

20. The method of claim 1, further comprising batch processing the DIP documents in the document queue uniquely assigned to a given user in response to polling that document queue.

* * * * *